United States Patent [19]
Takeda

[11] Patent Number: 4,653,931
[45] Date of Patent: Mar. 31, 1987

[54] SELF-CHARGING ELECTRONIC TIMEPIECE

[75] Inventor: Keigo Takeda, Shiojiri, Japan

[73] Assignee: Shiojiri Kogyo Kabushiki Kaisha, Japan

[21] Appl. No.: 672,727

[22] Filed: Nov. 19, 1984

[30] Foreign Application Priority Data

Nov. 21, 1983 [JP] Japan .............................. 58-218881
Apr. 5, 1984 [JP] Japan .............................. 59-67966

[51] Int. Cl.⁴ .......................... G04B 1/00; G04C 3/00
[52] U.S. Cl. .................................................. 368/205
[58] Field of Search ................... 307/66; 368/204, 205

[56] References Cited

U.S. PATENT DOCUMENTS

| | | | |
|---|---|---|---|
| 3,968,417 | 7/1976 | Dials | 368/204 |
| 4,040,247 | 8/1977 | Haydon | 368/204 |
| 4,237,385 | 12/1980 | Jurgens et al. | 307/66 |
| 4,316,275 | 2/1982 | Tabata | 368/204 |
| 4,328,572 | 5/1982 | Kawahara | 368/204 |
| 4,354,118 | 10/1982 | Spencer | 307/66 |
| 4,409,538 | 10/1983 | Tabata | 368/205 |
| 4,528,459 | 7/1985 | Wiegel | 307/66 |

Primary Examiner—Bernard Roskoski
Attorney, Agent, or Firm—Blum Kaplan Friedman Silberman & Beran

[57] ABSTRACT

An electronic timepiece including timekeeping circuitry and a primary power source for converting externally applied energy to electrical energy for powering the timekeeping circuitry. The electronic timepiece also includes a secondary power source for storing energy from the primary power source and powering the timekeeping circuitry. A power controller, coupled to the timekeeping circuitry, primary power source and secondary power source controls the source of power of the timekeeping means so that upon the application of external energy to the primary power source, when the timepiece is not operating in the secondary power source and cannot power the timekeeping circuitry the timepiece begins operating substantially simultaneously.

32 Claims, 13 Drawing Figures

FIG.3(b)
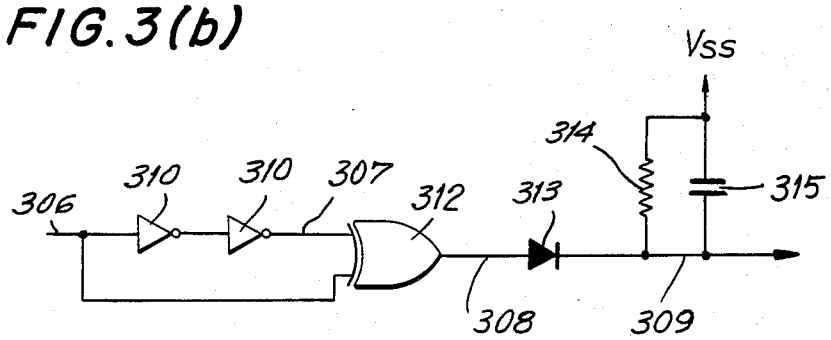
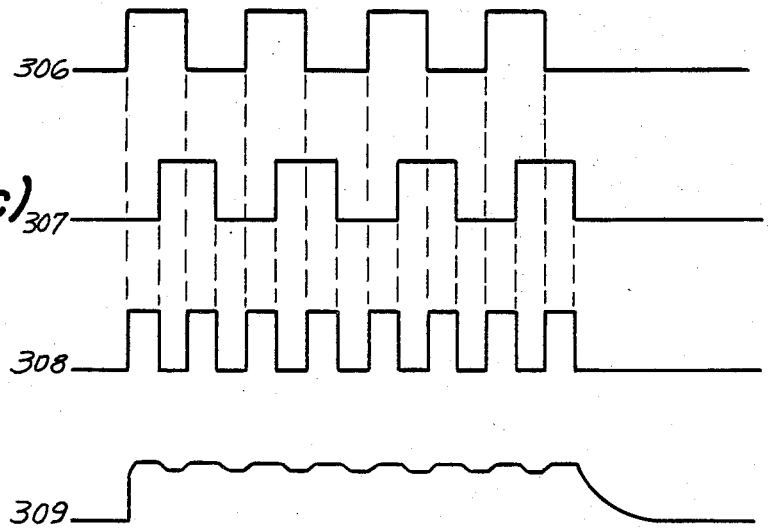
FIG.3(c)

SELF-CHARGING ELECTRONIC TIMEPIECE

BACKGROUND OF THE INVENTION

The invention is generally directed to an electronic timepiece with a self-charger and a storage device for storing the charge generated by the self-charger and in particular to a self-charging electronic timepiece utilizing a solar battery for an improved charge and storage system.

Electronic timepieces with self-chargers tend to supply energy to the timepiece mechanism for a long period of time without failure. As a result of the recent reduction in the cost of solar batteries, electronic timepieces incorporating solar batteries have been developed which have long useful lives. The solar battery, which performs a charging function, is considered the primary source of energy in these timepieces. However, electronic timepieces also have various storage means (secondary sources) to prevent the electronic timepiece from stopping when there is no flow of energy from the primary source, such as at night or when the timepiece is in a drawer.

Japanese patent laid open publication No. 52-67673 discloses a storage device applied to a button shaped battery which results in an extended life for a small timepiece with limited space for the battery.

Japanese patent laid open publication Nos. 51-121366 and 55-13498 disclose improved charge-storage systems which prevent the primary source from overcharging the storage device. In addition, Japanese patent laid open publication No. 58-137784 discloses an electronic timepiece which switches the source of power from a solar battery to a galvanic cell based on the magnitude of incident light.

Recently, to achieve a more reliable and longer-lived timepiece a solid electrolyte or condenser type storage device has been used. For example, Japanese patent laid open publication No. 58-176570, discloses a timepiece in which the time during which the hands are stopped due to inadequate voltage is corrected by rapid movement of the hands after charging is completed. However, the secondary sources tend to have a small capacity which requires an improvement in the charge-storage system or charge-discharge system.

In addition, the prior art electronic timepieces with a self-charging feature tend to operate unstably when the voltage of the power source applied to the electronic circuitry drops below a normal operating range. When the secondary energy source is exhausted the timepiece will not begin to operate until the energy supplied from the primary source is great enough to generate a satisfactory operating voltage level for the electronic circuitry of the electronic timepiece. This is especially a problem in situations where the primary source generates only small amounts of current, for example, in a low light situation where the primary source is a solar battery.

Reference is made to FIG. 7 wherein a functional block diagram of an electronic timepiece 700 with a solar battery 701 constructed in accordance with the prior art is depicted. The voltage across a timepiece circuit 702 and a secondary battery 703 are always at the same potential. Therefore, when the voltage across second battery 703 is 0 volts the voltage generated by exposing solar batteries 701 to light is only about 0.6 volts. A diode 704 prevents voltage from flowing back into solar battery 701 from secondary battery 703. As a result of this configuration timepiece circuit 702 will remain stopped for a significant period of time until secondary battery 703 is charged to a voltage at which timepiece circuit 702 can operate. This is a time consuming process and a major drawback to known timepieces with solar batteries.

The prior art has also developed charge control circuits for preventing the overcharging of the secondary battery. Such prior art includes U.S. Pat. Nos. 3,731,471 and 3,979,656. However, these references fail to consider the problem of the voltage across the secondary battery being too low to operate the circuitry.

Therefore, there are several basic problems with the prior art self-charging electronic timepieces. In particular, there is a need for a self-charging electronic timepiece which begins to operate immediately after exposure to light even when the secondary source is completely discharged.

SUMMARY OF THE INVENTION

Generally speaking, in accordance with the invention, an electronic timepiece is provided. The timepiece includes timepkeeping circuitry and a primary power source for converting externally supplied energy to electrical energy for powering the timekeeping circuitry. A secondary power source stores the energy from the primary power source and powers the timekeeping circuitry. A power controller, coupled to the timekeeping circuitry, primary power source and secondary power source controls the source of power of the timekeeping circuitry so that upon the application of external energy to the primary power source, when the timepiece is not operating and the secondary power source can not power the timekeeping circuitry, the timepiece begins operating substantially simultaneously.

Accordingly, it is an object of the instant invention to provide an improved self-charging electronic timepiece.

Another object of the invention is to provide an improved electronic timepiece, with a primary source and a secondary source, which operates immediately upon energization of the primary source, even if the secondary source is exhausted.

Yet another object of the invention is to provide a self-charging electronic timepiece which operates off the energy supplied by the primary source without also charging the secondary source to insure rapid start up of the electronic timepiece.

Still another object of the invention is to provide a self-charging electronic timepiece powered by a solar battery which will operate immediately upon exposure to light, even where the secondary power source is exhausted and the timepiece has not been exposed to light for an extended period of time.

A further object of the invention is to provide a self-charging electronic timepiece which prevents an overcharging of the secondary source and which provides for a rapid start-up of the electronic timepiece when the secondary source is completely exhausted and when the electronic timepiece is exposed to light.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3(b) is a circuit diagram of an oscillation detecting circuit constructed in accordance with an embodiment of the invention;

FIG. 3(c) is a timing diagram of the circuit of FIG. 3(b);

DETAILED DESCRIPTION OF THE PREFERRED EMBODIMENTS

Figure 1:
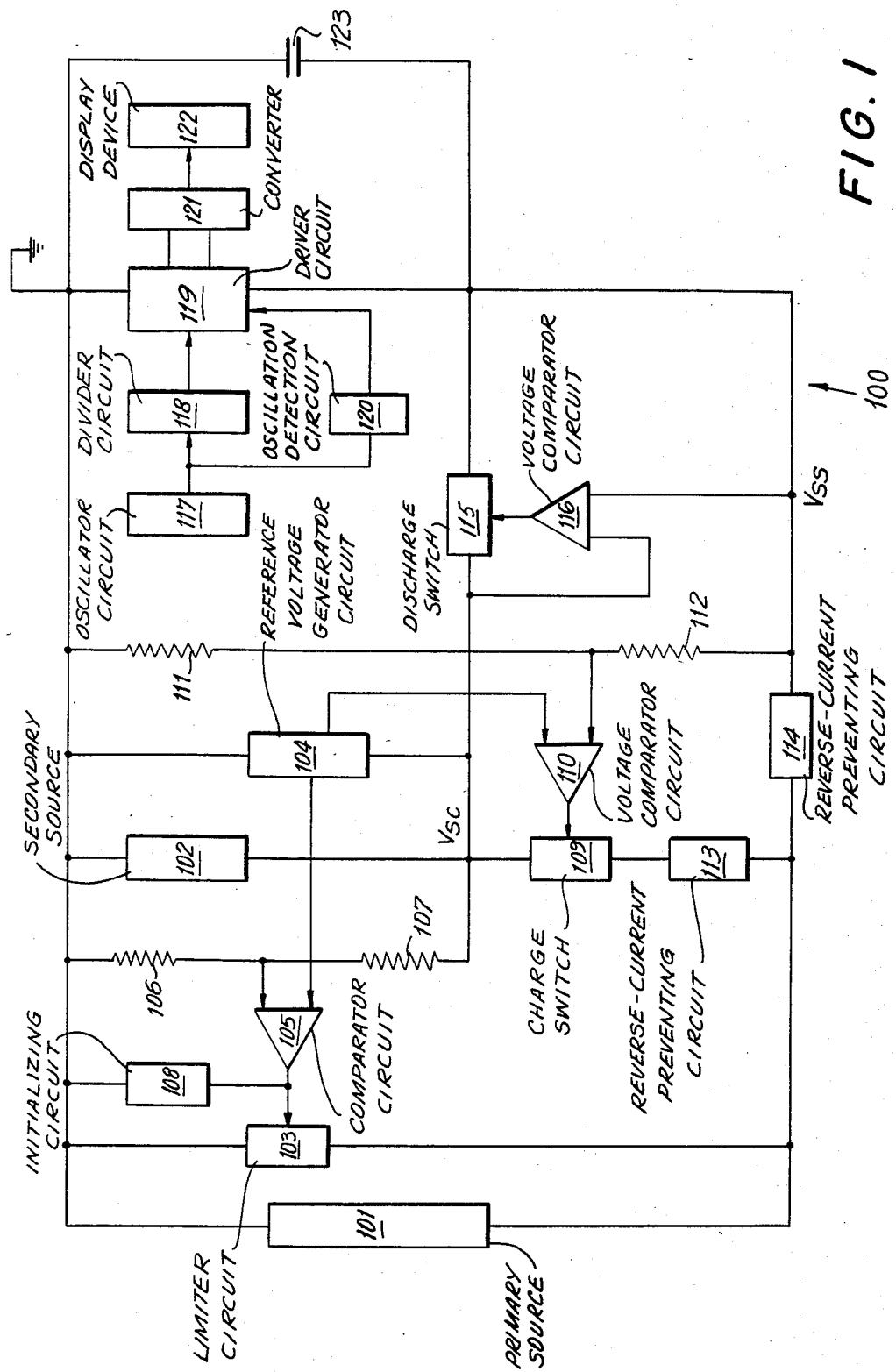
FIG. 1 is a functional block diagram of an electronic timepiece constructed in accordance with the invention.

Reference is first made to FIG. 1 wherein a block circuit diagram of an electronic timepiece, generally indicated as 100, constructed in accordance with the invention is depicted. A primary source 101, such as a solar battery, supplies energy from an external source. The solar battery converts incident light into electrical energy. A secondary source 102 stores energy supplied from primary source 101. Because the useful life of secondary source 102 tends to determine the useful life of the system, it is desirable to form secondary source 102 from a non-solution electrolytic element such as a solid electrolyte cell or a condenser. However, it is also possible to use a solution electrolyte cell such as an $Ag_2O$ cell or a Ni-Cd cell as secondary source 102. A voltage comparator circuit 105 compares a predetermined fraction of the voltage $V_{SC}$ of secondary source 102 with the same predetermined fraction of a maximum charging (or withstand) voltage $V_1$ generated by a reference voltage generator circuit 104.

When the magnitude of $V_{SC}$ is greater than $V_1$, limiter switch 103 turns ON and prevents primary source 101 from overcharging the electronic timepiece circuitry (reference numerals 117-123 as described below) and secondary source 102. Resistors 106 and 107 are used as a voltage divider to permit using only the predetermined fraction of $V_{SC}$, thereby permitting use of a lower value for $V_1$. It is desirable that resistors 106 and 107 have high resistances on the order of 10 megaohms to reduce energy dissipation.

It is also desired to limit the energy dissipation of voltage comparator circuit 105. This is accomplished by an initializing circuit 108 which sets limiter circuit 103 to a fixed position when the voltage across primary source 101 and secondary source 102 drops below an operating voltage ($V_{TH}$) of the electronic circuit constructed in accordance with the invention. A detailed explanation of the functioning of the various circuit components is discussed in more detail below.

Functional block 109 is a charging switch. A voltage comparator circuit 110 compares a voltage $V_{SS}$ of a driver circuit 119 with a voltage $V_2$ from reference voltage generator circuit 104 for operating an electro-mechanical converter 121. When the voltage $V_{SS}$ is greater than the voltage $V_2$, charge switch 109 turns ON. In this way energy supplied from primary source 101 can be transferred to secondary source 102 quickly and efficiently, thereby increasing the charging speed of secondary source 101. Resistance elements 111 and 112 adjust the voltage input to voltage comparator circuit 110 to permit using a predetermined position of $V_{SS}$, thereby permitting use of a lower value for $V_2$. As with resistance elements 106 and 107 it is desirable that resistance elements 111 and 112 have high resistance to limit the energy dissipated in this branch of the circuit. Likewise, the voltage here is also compared by sampling.

Reverse-current preventing circuits 113 and 114 are provided to prevent energy stored in secondary source 102 from being dissipated through primary source 101 when primary source 101 stops generating energy. In general, diode or transistor elements are utilized as reverse-current preventing circuits 113 and 114.

A discharge switch 115 turns ON when the voltage $V_{SC}$ is greater than the voltage $V_{SS}$ as compared by a voltage comparator circuit 116. When discharge switch 115 is ON secondary source 102 supplies energy to driver circuit 119.

An oscillator circuit 117 generates a clock signal utilized in the timekeeping circuit of this invention. A divider circuit 118 divides the clock signal generated by oscillator circuit 117 and outputs the divided signal to a driver circuit 119 in the proper timing pattern. An electro-mechanical converter 121 receives the signal from driver circuit 119 and converts the electrical signal into the movement of the hands of a display device 122. Where display device 122 is a display panel electro-mechanical converter 121 performs electro-optical conversion.

Oscillation detection circuit 120 provides a signal to driver circuit 119 so as to force the output of driver circuit 119 to either an H or L level when oscillator circuit 117 stops oscillating. A smoothing condenser 123 may be utilized to even the load variations in electro-mechanical converter 121. However, it is not necessary for the proper functioning of the electronic timepiece.

When the electronic timepiece as described above is in the state that the secondary source is fully discharged of energy and the timepiece has stopped operating, charge switch 109 is in the OFF state. As a result, charging energy generated by primary source 101 is directly applied to driver circuit 119 and oscillator circuit 117 thereby causing electronic timepiece 100 to begin operating immediately. For example, where primary source 101 is a solar battery, timepiece 100 begins to operate as soon as light contacts solar battery 101. In addition, because discharge switch 115 only turns on when the voltage $V_{SC}$, represented the voltage across the secondary source is greater than the operating voltage $V_{SS}$ of the electronic circuit, the energy generated by primary source 101 operates timepiece 100 without the need for secondary source 102 to reach a particular voltage level. In addition, this configuration aids in the efficient storing of excess energy, generated by primary source 101 in secondary source 102.

The circuit of FIG. 1 permits the electronic circuitry in a self-charging electronic timepiece to operate where the secondary energy source has a voltage difference close to 0 volts, and to begin operating immediately from a non-operating condition without various start-up problems. While the foregoing and following description is directed to the case where the primary source is a solar battery, thermal energy, kinetic energy, or magnetic energy, among others may be utilized instead of light energy to charge the primary source.

Turning now to the improved limiter circuit in accordance with the invention, shorting of the overcharge preventing transistors in the limiter circuit when the voltage of the secondary source is less than the voltage required to operate the electronic circuit must be prevented. When the voltage across the secondary source drops below the operating voltage of the limiter in conventional electronic timepieces with solar batteries, the switching state of the transistors in the limiter becomes unstable. As a result, the solar battery remains shorted. This is not the desired state except where the secondary source is overcharged. As a result, current does not flow to the secondary source and it does not charge.

Especially in low light situations the electromotive force supplied by the solar battery is so small that the secondary source will not charge at all no matter how long the solar battery is exposed to light. This is a major disadvantage of prior art self-charging electronic timepieces. As a result, users of prior art self-charging electronic timepieces have been required to charge the secondary source before the voltage stored therein drops below the threshold voltage of the electronic circuitry.

Figure 2A:
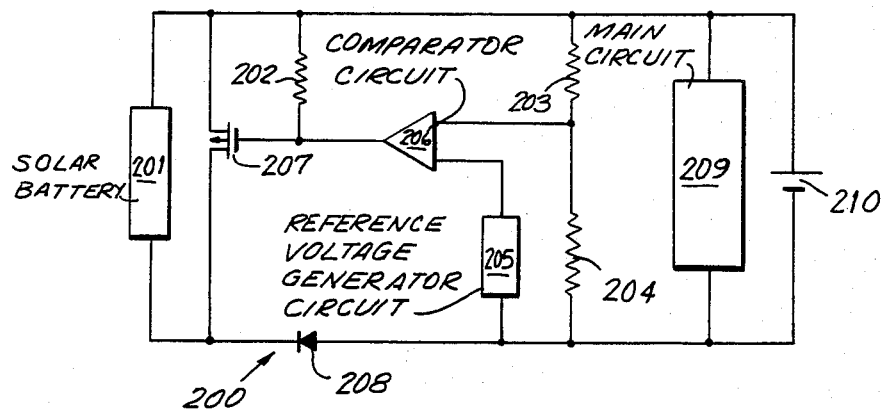
FIG. 2(a) is a circuit diagram of a limiter circuit construction in accordance with the invention.

Reference is next made to FIG. 2(a) wherein a self-charging electronic timepiece circuit, generally indicated as 200, constructed in accordance with the invention so as to eliminate the above noted problems with the prior art is depicted. Electronic timepiece 200 includes a solar battery 201 and a main circuit 209 not forming a part of the limiter. A limiter switch 207 formed of an NMOS field effect transistor is coupled with its source-drain path across the terminals of solar battery 201. A resistor 202 is coupled between one of the terminals of solar battery 201 and the control or gate electrode of limiter switch 207. The output of a voltage comparator circuit 206 is coupled to the junction of resistor 202 and the control electrode of limiter switch 207. One input of comparator 206 is coupled to a point between series resistors 203 and 204, the series resistors being coupled across solar battery 201. A reference voltage generator circuit 205 is coupled between the other input of voltage comparator 206 and the other input of solar battery 201. A diode 208 is positioned between solar battery 201 and secondary source 210 to prevent a discharge of voltage from secondary source 210 through solar battery 201 in the absence of light. The voltage divided between resistors 203 and 204 varies in accordance with the voltage across secondary source 210 which is one input to comparator 206. The other input to comparator 206 is the output from reference voltage generator circuit 205 which is not influenced by variations in the voltage across secondary source 210. Comparator 206 outputs a low signal when the voltage at the point between resistors 203 and 204 is higher than the reference voltage. This results in transistor 207 of the limiter switch being turned on and the voltage across solar battery 201 being shorted through limiter switch 207.

However, when the voltage across secondary source 210 drops below the operating voltage of generator circuit 205 and the operating voltage of comparator 206, the output of comparator 206 becomes unstable. The gate voltage of transistor 207 is, however, pulled up by resistor 202, thereby preventing transistor 207 from turning ON. If the impedance of resistor 202 is set at an appropriate level (on the order of several megaohms or several tens megaohms), where the voltage of the transistor is prevented from reaching a floating or unstable state, the improved power source switching is achieved at only the cost of a small increase in current consumption (on the order of about several nanoamperes to several tens of nanoamperes).

Figure 2B:
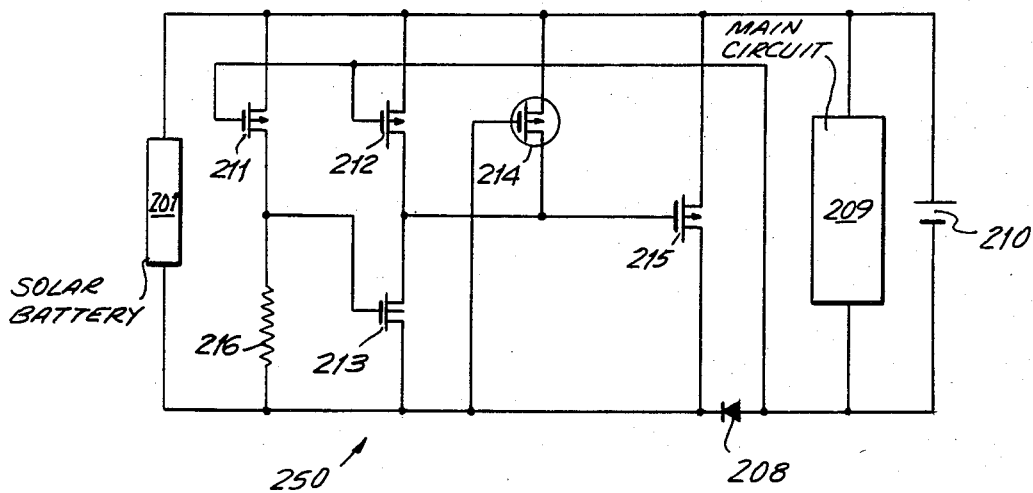
FIG. 2(b) is a circuit diagram of a limiter circuit constructed in accordance with an alternate embodiment of the invention.

Reference is next made to FIG. 2(b) wherein an alternate embodiment of an electronic timepiece, generally indicated as 250 constructed in accordance with another embodiment of the invention is depicted. Timepiece 250 includes a solar battery 201 and a secondary source 210 coupled across the terminals of solar battery 201. An N channel MOSFET 211 has its source-gate path terminals connected in series with a resistor 216, the series connection being connected across solar battery 201. The drain of MOSFET 211 is coupled to the same terminal of solar battery 201 as is resistor 216 is connected. An N channel MOSFET 212 has its source-gate path coupled in series with the source-drain path of P-channel MOSFET 213, the series connection being connected across solar battery 201. The gate of MOSFET 213 is coupled to the junction between the drain of MOSFET 211 and resistor 216. A depletion-type P-channel MOSFET 214 also has its source-gate path coupled across the source-drain path of MOSFET 212. The gate of MOSFET 214 is coupled to its same terminal of solar battery 201 as is resistor 216. As N-channel MOSFET 215 has its source-drain path coupled across solar battery 201. The gate of MOSFET 215 is coupled to the junction between the drains of MOSFET's 212 and 214, and the source of MOSFET 213.

The additional electronic timepiece circuits not essential to the functioning of the limiter portion of timepiece 250 are denominated as circuits 209. Circuits 209 are coupled across solar battery 201. A diode 208 is placed between secondary source 210 and solar battery 201 to prevent a reverse current flow which would dissipate the energy stored in secondary source 210 when solar battery 201 is not exposed to light.

The characteristics of depletion-type MOSFET 214 are the same as the functioning of initializing circuit 108 of FIG. 1. The circuit of FIG. 2(b) operates in the same manner as the circuit of FIG. 2(a).

The voltage of secondary source 210 is applied to the gates of MOSFET's 211 and 212. As the voltage of secondary source 210 increases the current in resistor 216 increases directly in proportion to the square of the voltage between the source and gate (hereinafter referred to as the gate voltage), of MOSFET 211. In addition, the gate voltage of MOSFET 213 also increases and MOSFET 213 turns ON. This has the effect of raising the gate voltage of MOSFET 215 and turning MOSFET 215 ON. The secondary source voltage necessary to turn MOSFET 215 ON is called the limiter voltage and is ordinarily set from about 1.8 volts to 2.0 volts and the threshold voltage and mu factor of each MOSFET is determined. It is desirable for resistor 216 to be a variable resistor so as to allow easy adjustment of the limiter voltage.

The situation wherein the secondary source voltage drops below the threshold voltages (hereinafter referred to as $V_{TH}$) of the various MOSFETS is next described. MOSFETs 211, 212 and 213 are enhancement type MOSFETs. Therefore, when the gate voltage becomes less than $V_{TH}$, the MOSFETs fail to operate and the potential at the gate of MOSFET 215 shifts to a floating state. When the voltage of secondary source 210 is below the level described above, it is necessary that current flow through MOSFET 214 so that the gate of MOSFET 215 is pulled high. To insure this result MOSFET 214 is formed as a depletion type MOSFET allowing current to flow even when the gate voltage is 0 volts. MOSFET 214 may be replaced by a resistor. However, in this embodiment transistors are utilized as bias setting resistance elements.

The embodiments described above, constructed in accordance with the invention, prevent the limiter from shorting out at low voltage levels (at or lower than about 0.6 V). This circuit configuration automatically sets the timepiece in condition for charging and operation even though the secondary source is completely discharged and the absence of voltage across the secondary source prevents the limiter from operating normally.

Reference will next be made to a circuit for preventing energy loss caused when the voltage across the secondary source drops below the voltage required to generate oscillation of the oscillator circuit in an analog display electronic timepiece in accordance with conventional methods.

Conventional analog display electronic timepieces utilize a motor driving method. The motor is an electro-mechanical converter driven by a signal from a driver circuit. Pulses are applied to motor terminals (hereinafter referred to as $0_1$, $0_2$), alternately under the control of a flip-flop in the output stage of the driver circuit.

If the potentials of the input and the output of the flip-flop differ from each other when the voltage in the timepiece drops to a level at which the oscillation of the oscillation circuit stops, there is a potential difference between motor terminals $0_1$ and $0_2$. As a result, a current of several hundred microamperes to several milliamperes continues flowing in the motor as long as oscillation does not begin. There is approximately a 50% chance that the above will occur. Thus, in one out of every two timepieces where oscillation, for some reason stops, the secondary source will continue to discharge even though the timepiece is not functioning. As a result, the secondary source will continue to discharge until it is completely discharged.

In an electronic timepiece it is important that the timepiece begin charging after oscillation has stopped. One important step to insure that this occurs is to restrain the discharge of the secondary source when oscillation has halted.

In accordance with the conventional motor driving method, the potential at motor terminals $0_1$ and $0_2$ when oscillation stops is uncertain. As a result, energy generated by the solar battery is exhausted between motor terminals $0_1$ and $0_2$ even when charging is attempted. This results from the current generated by the primary source flowing through the motor and thereby preventing the charging of the secondary source.

Figure 3A:
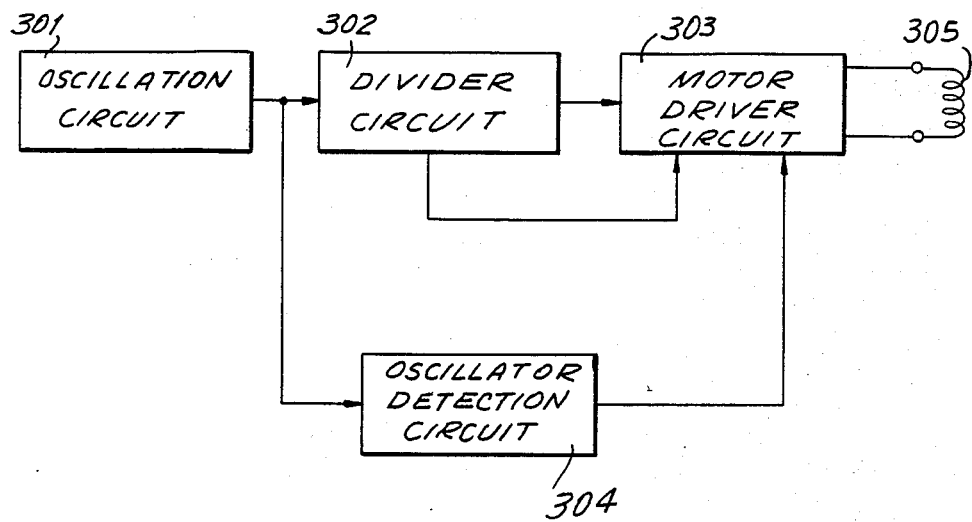
FIG. 3(a) is a functional block diagram of an electronic circuit which converts an electric signal for use by a display device in accordance with the invention.

Reference is next made to FIG. 3(a) wherein a functional block diagram of a circuit useful in preventing the unnecessary discharge of the secondary source when oscillation has halted is depicted. FIG. 3(a) shows a simplified version of the components necessary for the circuit. An oscillator circuit 301 is coupled to a divider circuit 302 and an oscillation detection circuit 304. Divider circuit 302 is coupled to a motor driver circuit 303. Motor driving circuit 303 is coupled to a motor 305 which is an electro-mechanical converter.

A reference signal (32768 Hz) is generated by oscillator circuit 301. The reference signal is divided into a 2 Hz signal by divider circuit 302 and is differentiated to a desired pulse width by motor driver circuit 303. The differentiated signal then drives motor 305. The pulse width, which is generally about 6–7 msec. is established by an intermediate frequency clock output from divider circuit 302 input to motor driver circuit 303. When oscillation halts the output of oscillation detection circuit 304 changes and controls the condition of motor driver circuit 303.

Reference is made to FIG. 3(b) wherein a preferred embodiment of an oscillation detection circuit 304 constructed in accordance with the invention is depicted. Point 306 is the oscillation output (32768 Hz) of oscillator circuit 301 in FIG. 3(a). The oscillation output is input to one terminal of exclusive OR gate 312 (hereafter referred to as EXOR) and is input to the other terminal of EXOR gate 312 through series inverters 310 and 311. The signal at point 307, which has passed through inverters 310 and 311, is delayed as compared to the signal entering EXOR gate 312 directly from input 306. The output 308 of EXOR gate 312 has a waveform (65536 Hz) having double the frequency of oscillation output 306. The output of EXOR gate 312 is applied to diode 313, which is coupled to point 309. Parallel-connected resistor 314 and capacitor 315 are connected between point 309 and voltage $V_{SS}$.

The phase relationships of the various signals in the circuit of FIG. 3(b) are depicted in FIG. 3(c). FIG. 3(c) shows signals at points 306, 307, 308 and 309 in FIG. 3(b). When the signal at point 308 is at a high level (hereafter referred to as H), diode 313 is forward biased. As a result, an electric charge is stored in capacitor 315 and the signal at point 309 is H. Resistor 314 and capacitor 315 from an RC circuit. Therefore, the stored electric charge in capacitor 315 is discharged through resistor 314, which is connected to low potential source $V_{SS}$. However, by setting the time constant of the RC circuit including resistor 314 and capacitor 315 longer than the period of signal 308, the signal at point 309 stays H as long as there is oscillation. In a preferred embodiment, capacitor 315 is on the order of 10 PF and resistor 314 is on the order of 10 Mohms.

The signal at point 309, depicted in FIG. 3(c), is the waveform of the terminal voltage of capacitor 315. When oscillation stops, signal 306 may either be H or LOW (hereinafter referred to as L). However, signal 308 necessarily remains L. Therefore, diode 313 is back biased and prevents the current from flowing to capacitor 315 from EXOR gate 312. Capacitor 315 discharges through resistor 314 and the signal at point 309 is L when there is no oscillation. In this way, the circuit depicted in FIG. 3B outputs an H signal when there is oscillation and outputs an L signal when there is no oscillation at point 309.

In addition, in order to improve the performance of the circuit the waveform of the signal at point 309 and the time constant for charging and discharging must be stabilized. Because current control by a diode uses a large forward voltage (about 0.3 to 0.6 V), the use of a transmission gate is preferable. Modifications such as these are easily accomplished without varying from the principles described above with regard to the circuit of FIG. 3(b).

Figure 3D:
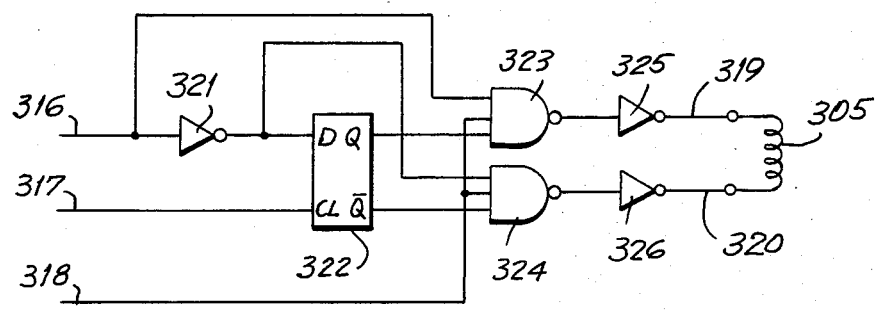
FIG. 3(d) is a circuit diagram of a motor driver circuit constructed in accordance with an embodiment of the invention.
Figure 3E:
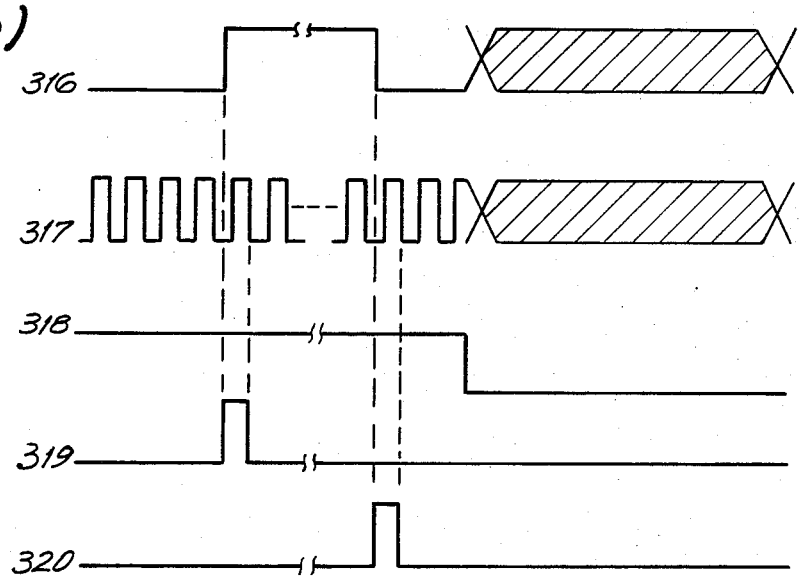
FIG. 3(e) is a timing diagram for the circuit of FIG. 3(d)

Reference is next made to FIGS. 3(d), and 3(e) wherein a motor driver circuit constructed in accordance with the preferred embodiment of the invention and a timing chart showing the operation of the circuit at various points are depicted. There are three inputs 316, 317 and 318 to the circuit of FIG. 3(d). Input signal 316 is a 0.5 Hz waveform from the divider circuit. Input signal 317 is a 128 Hz signal from the divider circuit and input signal 318 is the output of the oscillation detection circuit stabilized as described above. Input signal 316 is coupled to an inverter 321 and one input of a three input NAND gate 323. The output of inverter 321 is an input to the D input of a flip-flop 322 and to a second three input NAND gate 324. Input signal 317 is the clock input to flip-flop 322. Input signal 318 is a second input to both NAND gate 323 and NAND gate 324. The Q output of flip-flop 322 is the third input to NAND gate 323 and the inverted, $\bar{Q}$ output of flip-flop 322 is the third input to NAND gate 324. Inverting drivers 325 and 326 are connected, respectively, to NAND gates 323 and 325. The outputs of drivers 325 and 326 are motor terminals 319 and 320 which are coupled to a motor 305.

As the rising edge of input signal 316 goes from L to H, a high input to NAND gate 323 is received, NAND gate 323 outputs an L signal, which is inverted by driver 325, and motor terminal 319 becomes H. Likewise, on the falling edge of input signal 316, as signal 316 goes from H to L, the inputs of NAND gates 324 are adjusted so as to cause motor terminal 320 to go to an L level. The result is that a driving signal is applied to one of terminals 319 and 320 at one second intervals. However, as is clearly seen in FIG. 3(e) the signals alternate between motor terminals 319 and 320 causing current to flow through motor 305 in alternating directions, thereby effecting the movement of the hands of a timepiece. The above described operation is the same as that in a conventional driver circuit.

In fact, if signal 318, which indicates the oscillation or non-oscillation of the oscillation circuit, is always at a H level a conventional motor driver circuit is simulated.

However, there are radical differences between the conventional driver circuit and the driver circuit of FIG. 3(d) when oscillation is halted. For example, if when oscillation halts signal 318 is held H, and signal 316 and the output Q of D-type flip-flop 322 are held L, the output of NAND gate 323 goes H and the output of NAND gate 324 goes L. In addition, these outputs are amplified by drivers 325 and 326 resulting in a large current flowing through motor 305. The large current flowing through motor 305 will rapidly discharge the energy stored in the secondary source when oscillation has stopped and the timepiece is not operating.

However, in accordance with the motor driving circuitry of FIG. 3(d), constructed in accordance with the invention, a different result is obtained when oscillation ceases. In particular, signal 318 goes L and NAND gates 323 and 324 are disabled. This forces the outputs of NAND gates 323 and 324 to an H state which causes motor terminals 319 and 320 to both go to an L state. When both motor terminals 319 and 320 are L, current will not flow through motor 305 and the secondary source is not unnecessarily discharged when no oscillation is detected. In the circuit of FIG. 3(d), signal 318, which is representative of the presence or absence of oscillation in the oscillation circuit, controls the output of the differentiation circuit made up of inverter 321, flip-flop 322 and NAND gate 323, 324.

Other circuits which will also force the motor terminals to be at the same potential when there is no oscillation are also possible. For example, drivers 325 and 326 can be replaced by a NAND gate or a clocked gate where the output of the differentiation circuit is controlled by signal 318. This altered configuration is another embodiment of a motor driver circuit construction in accordance with the invention. It is also possible to set input signal 316 to an L state and flip-flop 322 to an H state.

In FIG. 3(e) the interrelationship of waveforms at various points in the circuit of FIG. 3(d) is depicted. As noted above, waveform 316 is a 0.5 Hz signal, input signal 317 is a 128 Hz signal and input signal 318 is the output of the oscillation detection circuit. Waveforms 319 and 320 are the output waveforms of drivers 325 and 326. The hatched portions of signals 316 and 317 indicate regions where the states of signals 316 and 317 are uncertain due to the absence of oscillation. As described above with respect to the circuit of FIG. 3D, signals 319 and 320 remain in an L state as long as input signal 318, corresponding to the non-oscillation of the oscillating circuit, is L.

In a practical electronic timepiece circuit negative logic is utilized, so that the motor terminals are usually in an H state and the active state is the L state. However, the positive logic circuitry described above is equally functional.

Thus, in accordance with the motor driving circuitry constructed in accordance with the invention as described above, the energy consumption of the motor is significantly reduced when the electronic circuitry is not operated. This allows the secondary source to be more quickly charged by the primary source even if the secondary source is almost completely discharged when the electronic circuit ceases operating. As a result, the period of time before the electronic timepiece again begins operating can be further shortened by utilizing the energy remaining in the secondary source which is prevented from flowing through the motor by the above circuit.

Figure 4:
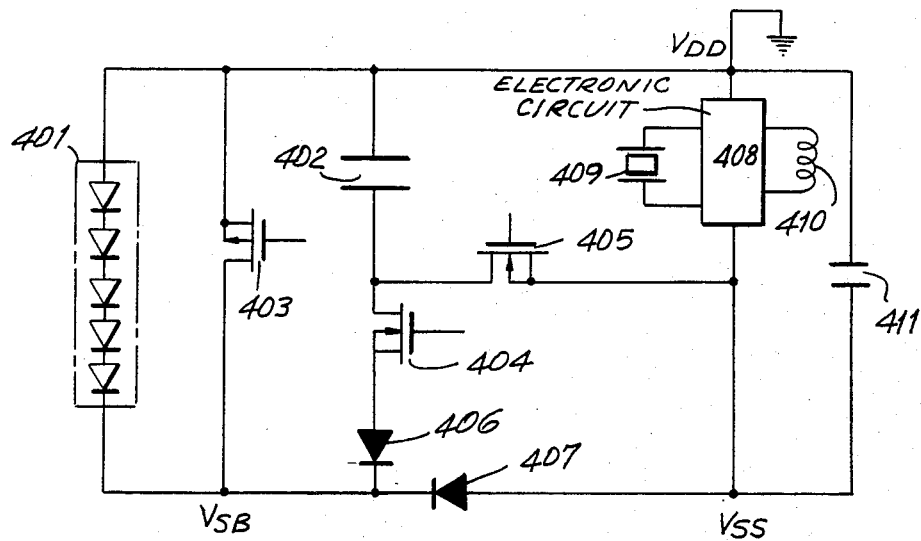
FIG. 4 is a circuit diagram of a charge-storage-discharge system constructed in accordance with an embodiment of the invention.

Reference is next made to FIG. 4 wherein a preferred embodiment of a charge-storage-discharge system as indicated in the block diagram of FIG. 1 is depicted. A solar battery 401 is used as the primary source and an electric double layer condenser 402, having a large capacity, is used as the secondary source. The circuit includes a limiter switch 403, a charging switch 404 and a discharging switch 405. Switches 403, 404, 405 utilize MOS transistors so that energy dissipation by the switches is minimized. The source-drain path of N-channel MOSFET 403 is coupled across solar battery 401. The source-drain path of P-channel MOSFET 404 is coupled between condensor 402 and diode 406, the series connection of the three components being coupled across solar battery 401. P-channel transistor 405 is coupled with its source-drain path between the junction of condensor 402 and MOSFET 402, and the junction between circuit 408 and diode 407. Diodes 406 and 407 are utilized to prevent the reverse flow of current. An electronic circuit 408 includes the above described driver circuit for driving motor coil 410. In addition, electronic circuit 408 includes an oscillator circuit for operating a quartz crystal vibrator 409 and a divider circuit as well as other required circuits. A capacitor 411 is used to flatten the load variations of the motor. Capacitor 411 is on the order of several microfarads. The interaction of the various components is as described with respect to the elements in FIG. 1.

In the embodiment of FIG. 4 the ON and OFF states of charging switch 404 are controlled by using a comparator to compare the operating voltage $V_{SS}$ of the electronic circuit with the voltage $V_2$ required to operate the circuitry. To further improve this system it is also possible to control charging switch 404 by inputting the output of oscillation detection circuit 120 (FIG. 1) to an AND gate and by utilizing the output of the AND gate. An embodiment wherein the output of oscillation detecting circuit 120 is utilized will be briefly described below.

Figure 5:
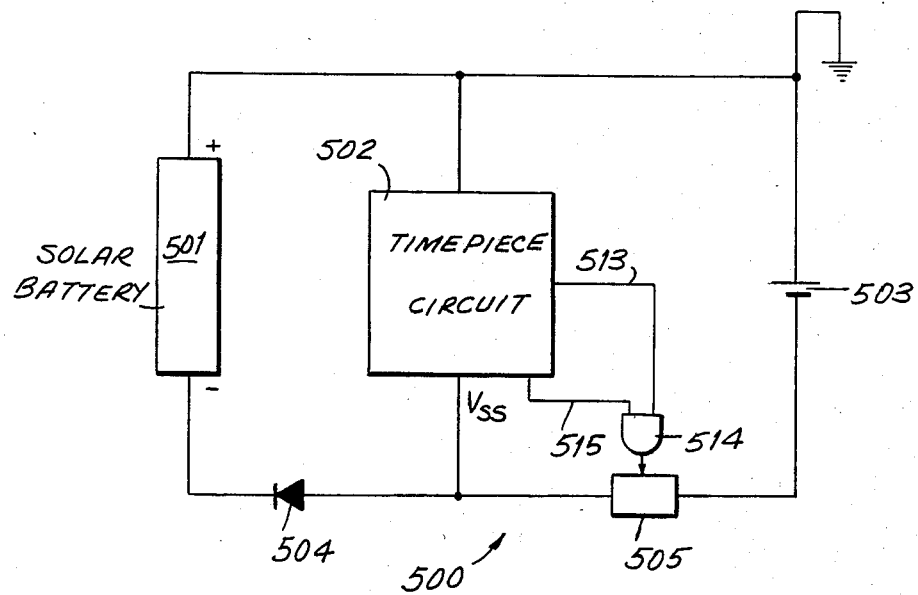
FIG. 5 is a functional block diagram of an electronic timepiece with a solar battery constructed in accordance with an embodiment of the invention.
Figure 6:
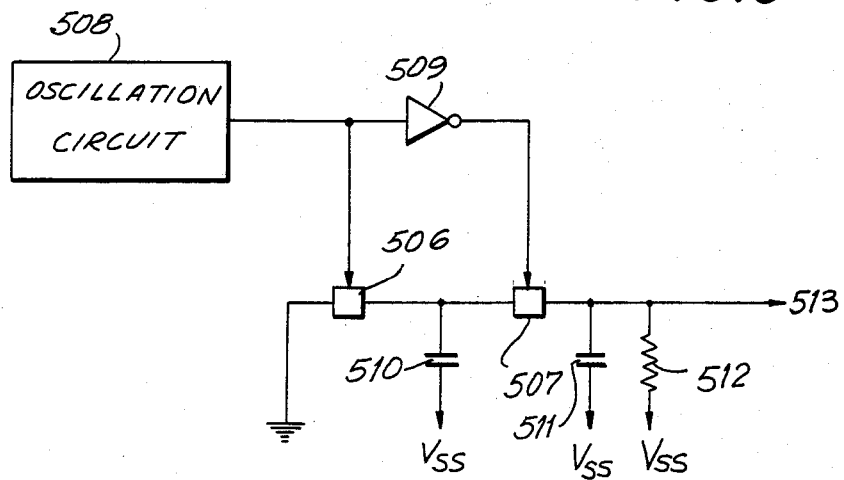
FIG. 6 is a circuit diagram of an oscillation detecting circuit for detecting oscillation in an electronic timepiece with a solar battery constructed in accordance with the invention.
Figure 7:
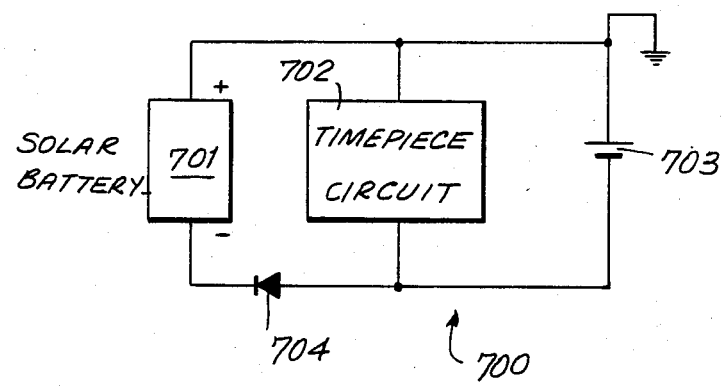
FIG. 7 is a functional block diagram of a timepiece with a solar battery constructed in accordance with the prior art.

Reference is next made to FIG. 5 wherein an alternate embodiment of an electronic timepiece with a solar battery, generally indicated as 500, constructed in accordance with the invention is depicted. Timepiece 500 includes a solar battery 501 which supplies power to a timepiece circuit 502 and a secondary battery 503 thereby forming a charging loop. A diode 504 prevents the reverse flow of current. A transmission gate 505 is connected in series between the power inputs of timepiece circuit 502 and secondary battery 503. A control signal 513 is output from the oscillation detection circuit included in timepiece circuit 502 to a first input of AND gate 514. One embodiment of an oscillation detection circuit capable of producing control signal 513 is depicted in FIG. 6. The second input to AND gate 514 is a signal 515 generated by a secondary battery detector within timepiece circuit 502. The output of AND gate 514 controls the turning ON and OFF of transmission gate 505.

Reference is next made to FIG. 6 wherein the oscillation detection circuit included in timepiece circuit 502 of FIG. 5 is depicted. The detector is coupled to an oscillation circuit 508. The detection circuit includes an inverter 509 coupled directly to the output of oscillation circuit 508. Transmission gates 506 and 507 are connected in series between ground and output 513. The other terminal of transmission gate 506 is coupled to ground. The control terminal of transmission gate 506 is coupled directly to the output of oscillation circuit 508. The control terminal of transmission gate 507 is coupled to the output of oscillation circuit 508 through inverter 509. A capacitor 510 is coupled between the junction between transmission gates 506 and 507 and a voltage $V_{SS}$ corresponding to an L state. A capacitor 511 and a resistor 512 are coupled in parallel between the output 513 and a voltage $V_{SS}$.

When oscillation circuit 508 stops oscillating the output of oscillation circuit 508 is maintained at either a H or L level. In either of these cases one of transmission gates 506 and 507 will be OFF. As a result, the electric charge stored in capacitor 511 is discharged through resistor 512 causing output signal 513 to stabilize at the $V_{SS}$ (the L state).

Referring again to FIG. 5, the effect of output signal 513 going to the L state is that transmission gate 505 turns OFF. This prevents conduction of current between secondary battery 503 and timepiece circuit 502. As a result, when solar battery 501 is exposed to light, a high voltage can be applied to timepiece circuit 502 even where secondary battery 503 is completely discharged and has a 0 volt voltage differential across its terminals.

Once oscillation begins, output signal 513 of the oscillation detection circuit goes to the H state. However, transmission gate 505 does not automatically turn on. In fact, transmission gate 505 does not turn on until signal 515, representative of the voltage across secondary battery 503, reaches a predetermined level. In this way timepiece circuit 502 can operate when secondary battery 503 is not charged above the minimum required voltage to operate the timepiece.

Additional circuitry is required to effectively charge the secondary battery. This includes additional circuitry which adds resistance to the transmission gate 505 so that secondary battery 503 is slowly charged and damage to secondary battery 503 is avoided due to overcharging. This may be accomplished by intermittently switching transmission gate 505 to control the charge stored in secondary battery 503.

In any case, a reference clock signal is required to control a circuit consisting of logical elements. Therefore, once sufficient voltage is generated so as to cause timepiece circuit 502 to begin operating, oscillation begins and the various means of controlling the charging and the discharging of the various power sources can be effected. However, the circuitry insures that as oscillation halts the circuit is in the correct state to begin operating immediately upon the illumination of solar battery 501.

Figure 8:
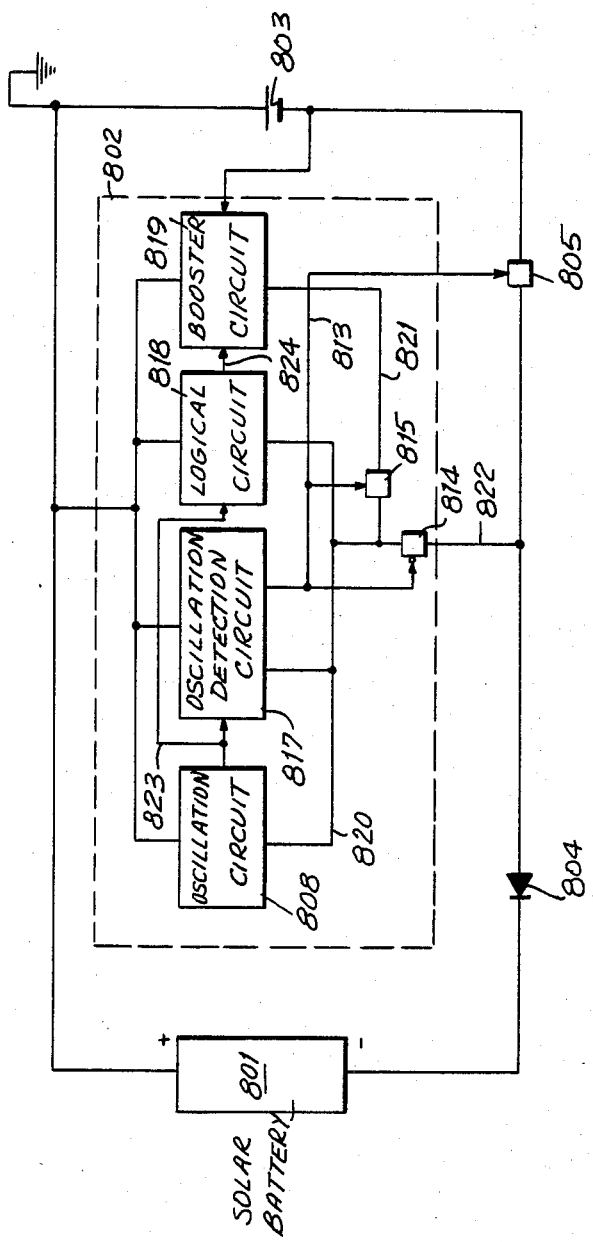
FIG. 8 is a functional block diagram of a power source circuit constructed in accordance with the invention.

Reference is next made to FIG. 8 wherein another embodiment of the invention depicting in detail a power source system for an electronic timepiece with a solar battery is shown. The electronic timepiece, generally indicated as 800, includes a solar battery 801, a timepiece circuit 802 and a secondary battery 803. In addition, the electronic timepiece includes a transmission gate 805 and a diode 804.

The power source control system will be described with reference to FIG. 8. The functioning of the circuit of FIG. 8 is described where secondary battery 803 is almost completely discharged and has a low voltage, that is about 0.5 volts. Timepiece circuit 802 includes an oscillation circuit 808, an oscillation detection circuit 817, a logical circuit 818, a booster circuit 819 and transmission gates 814 and 815. The output of oscillation circuit 808, a signal 823, is input to oscillation detection circuit 817 and logical circuit 818. The output 824 of logical circuit 818 is coupled to booster circuit 819. The negative terminal of secondary source 803 is coupled to booster circuit 819. Oscillation circuit 808, oscillation detection circuit 817, logical circuit 818 and booster circuit 819 are each coupled at one side to the positive terminal of solar battery 801. The other side of oscillation circuit 808, non-oscillation circuit 817 and logical circuit 818 are each coupled to point 820 at one side of transmission gate 814, the other side of said gate being coupled to point 822, the negative terminal of solar battery 801. The control terminals of transmission gates 814, 815 and 805 are coupled to the output signal 813 of oscillation detection circuit 817. Transmission gate 805 is coupled between the negative terminal of secondary battery 803 and point 822, which point is coupled to the negative terminal of solar battery 801 by diode 804. Transmission gate 815 is coupled between the other side of booster circuit 819 and point 820.

When oscillation circuit 808 does not oscillate, no oscillation signal 823 is provided. Oscillation detection circuit 817 detects the termination of oscillation so that output signal 813 becomes L. As a result, transmission gate 814 is turned ON and transmission gates 815 and 805 are turned OFF. This results in power input 820 of oscillation circuit 808 being switched from power source 821, derived from booster circuit 819 to power source 822 flowing from solar battery 801. Therefore, when solar battery 801 is exposed to light, oscillation circuit 808, oscillation detection circuit 817 and logical circuit 818 are provided with sufficient voltage to allow oscillation and oscillation actually begins. Once oscillation has begun, the booster clock signal 824, output from logical circuit 818, and required for voltage boosting, is generated. As a result, booster circuit 819 begins boosting the voltage output from secondary battery 803 and an increased voltage is output as booster power source 821.

Once sufficient voltage has been generated to restart oscillation circuit 808, oscillation detection circuit 817 shifts to an H state turning transmission gate 814 OFF and transmission gates 815 and 805 ON. Thereafter, electronic circuit 802 is powered by secondary battery 803 even though the voltage stored in secondary battery 803 is below the voltage level required for oscillation. Even though the voltage of secondary battery source 803 is below that required by the electronic circuitry for oscillation, the voltage is boosted by booster circuit 819 coupled to secondary battery 803. Of course, the energy in secondary battery 803 is supplied by solar battery 801. In this embodiment it is noted that timepiece circuit 802 can be operated by secondary battery 803 even when the voltage across secondary battery 803 is below the voltage level required for oscillation of oscillator circuit 808.

Booster circuit 819 described in FIG. 8 is of the condenser type generally applied to liquid crystal display devices. As a result, no further discussion of this element is required.

In order to stabilize the output voltage 821 of booster circuit 819, the amplitude of voltage boosting performed by booster circuit 819 is varied in response to the voltage level of secondary battery 803 and a constant voltage circuit is used. This is a conventional circuit and is not further described. Likewise, logical circuit 818 includes all of the circuits required by the timepiece. Oscillation detection circuit 817 is comparable to the oscillation detection circuit of FIG. 6.

Accordingly, an electronic timepiece with a solar battery and a secondary battery which begins operating immediately upon exposure to light when the secondary battery has been discharged below the level required to power the timepiece is provided. Therefore, electronic timepieces with solar batteries can be relied upon in difficult situations and under harsh conditions. More commercially important, an electronic timepiece which has been stored in a box or other dark environment over an extended period of time will operate immediately upon exposure to light even if the secondary battery has become discharged during the storage period. This is particularly important as the proper functioning of the timepiece can be confirmed immediately after exposure to light which is both functionally superior and commercially necessary.

As a result of recent advances in miniaturization smaller and thinner timepieces have been developed and produced which have considerably less room for the power source. Therefore, there is a greater need for electronic timepieces which rely upon solar batteries as the primary source of energy.

In addition, the electronic timepiece constructed in accordance with the invention conserves the power in the secondary battery under unusual situations. In particular, where the timepiece is left in a dark place for a long time and the secondary battery is discharged to the extent that oscillation can not continue, the secondary battery is prevented from further discharging. This has two positive results. First, unnecessary current consumption by the timepiece circuit is avoided. Second, and more importantly, because the discharge of current from the secondary battery stops as soon as the oscillation halts, the period of time to fully recharge the secondary battery is significantly shortened.

In the description of the preferred embodiments of the invention reference has mainly been made to a timepiece having an analog display. However, the invention is equally applicable to liquid crystal display timepieces as well as other display types.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electronic timepiece, comprising:
   timekeeping means;
   primary power means for converting externally applied energy to electrical energy for powering the timekeeping means;
   secondary power means for storing energy from the primary power means and powering the timekeeping means; and
   power control means, coupled to the timekeeping means, primary power means and secondary power means for electrically disconnecting the secondary power means from the timekeeping means and applying power directly from the primary power means to the timekeeping means so that upon the application of external energy to the primary power means, when the timepiece is not operating and the secondary power means cannot power the timekeeping means, the timepiece begins operating substantially simultaneously.

2. The electronic timepiece of claim 1 wherein the power control means comprises oscillation detection means for detecting oscillation and non-oscillation of the timekeeping means, said oscillation and non-oscillation corresponding to the operating and non-operating states, respectively, of the timepiece; and switching means, coupled to the oscillation detection means for switching the source of power of the timekeeping means from the primary power means to the secondary power means and vice versa based on the oscillation or non-oscillation of the timekeeping means.

3. The electronic timepiece of claim 1 wherein the power control means comprises oscillation detection means for detecting oscillation and non-oscillation of the timekeeping means, said oscillation and non-oscillation corresponding to the operating and non-operating states, respectively, of the timepiece; and switching means, coupled to the oscillation detection means for switching the source of power of the timekeeping means from the primary power means to the secondary power means and vice-versa based on the oscillation or non-oscillation of the timekeeping means and the energy stored in the secondary power means.

4. The electronic timepiece of claim 1 wherein the primary power means is a solar battery.

5. The electronic timepiece of claim 1 wherein the secondary power means is a battery.

6. The electronic timepiece of claim 1, wherein the secondary power means is a non-solution electrolytic element.

7. The electronic timepiece of claim 1, wherein the secondary power means is a solution electrolytic cell.

8. The electronic timepiece of claim 2 further comprising voltage booster means coupled to the secondary power means for boosting the voltage across the secondary power means to a level at which the timepiece will operate and outputting the boosted voltage from the secondary power means to the timekeeping means for powering the timekeeping means.

9. The electronic timepiece of claim 3 further comprising voltage booster means coupled to the secondary power means for boosting the voltage across the secondary power means to a level at which the timepiece will operate and outputting the boosted voltage from the secondary power means to the timekeeping means for powering the timekeeping means.

10. The electronic timepiece of claim 2 wherein the switching means causes the timekeeping means to be powered by the primary power means when the oscillation detection means detects no oscillation and the secondary power means cannot power the timekeeping means, and causes the timekeeping means to be powered by the secondary power means when the oscillation detection means detects the oscillation of the timekeeping means.

11. The electronic timepiece of claim 3 wherein the switching means causes the timekeeping means to be powered by the primary power means when the oscillation detection means detects no oscillation and the secondary power means cannot power the timekeeping means, and causes the timekeeping means to be powered by the secondary power means when the oscillation detection means detects the oscillation of the timekeeping means.

12. The electronic timepiece of claim 3, wherein the switching means powers the timekeeping means from the primary power means when the voltage of the secondary power means is below a predetermined level and powers the timekeeping means from the secondary power means when the voltage across the secondary power means is at or above the predetermined level.

13. The electronic timepiece of claim 1 further comprising limiter means for preventing the overcharging of the secondary power means by the primary power means coupling the primary power means to the timekeeping means for preventing an unstable state of the limiter means when the timepiece is in the non-operating state and the secondary power means cannot power the timekeeping means.

14. The electronic timepiece of claim 2 further comprising limiter means for preventing the overcharging of the secondary power means by the first power means and coupling the first power means to the timekeeping means when the timepiece is in the non-operating state and the secondary power means cannot power the timekeeping means.

15. The electronic timepiece of claim 3 further comprising limiter means for preventing the overcharging of the secondary power means by the first power means and coupling the first power means to the timekeeping means when the timepiece is in the non-operating state and the secondary power means cannot power the timekeeping means.

16. The electronic timepiece of claim 2 wherein the oscillation detection means comprises an exclusive OR gate; time delay means coupled to the timekeeping means, wherein the inputs to the exclusive OR gate are the output of the timekeeping means and the output of the timekeeping means delayed by the time delay means; and biasing means coupled to the output of the exclusive OR gate for biasing the output of the exclusive OR gate.

17. The electronic timepiece of claim 16 wherein the time delay means comprises at least one diode.

18. The electronic timepiece of claim 3 wherein the oscillation detection means comprises an exclusive OR gate; time delay means coupled to the timekeeping means, wherein the inputs to the exclusive OR gate are the output of the timekeeping means and the output of the timekeeping means delayed by the time delay means; and biasing means coupled to the output of the exclusive OR gate for biasing the output of the exclusive OR gate.

19. The electronic timepiece of claim 18 wherein the time delay means comprises at least one diode.

20. The electronic timepiece of claim 1 further comprising motor driver means coupled to the timekeeping means for displaying time related information.

21. An electronic timepiece, comprising:
timekeeping means;
primary power means for converting externally applied energy to electrical energy for powering the timekeeping means;
secondary power means for storing energy from the primary power means and powering the timekeeping means;
discharge switch means coupled between the secondary power means and the timekeeping means for electrically coupling the secondary power means and timekeeping means when the voltage across the secondary power means is greater than the minimum voltage necessary to drive the timekeeping means;
charge switch means coupled between the primary power means and the secondary power means for electrically coupling the primary power means and secondary power means, to charge the secondary power means, when the voltage powering the timekeeping means is greater than the minimum voltage necessary to drive the timekeeping means; and connecting means coupled between the primary power means and timekeeping means for directly electrically connecting the primary power means to the timekeeping means.

22. An electronic timepiece, comprising:

timekeeping means;

primary power means for converting externally applied energy to electrical energy for powering the timekeeping means;

secondary power means for storing energy from the primary power means and powering the timekeeping means; and power control means, coupled to the timekeeping means, primary power means and secondary power means, for controlling the source of power of the timekeeping means so that upon the application of external energy to the primary power means, when the timepiece is not operating and the secondary power means cannot power the timekeeping means, the timepiece begins operating substantially simultaneously, wherein the power control means comprises oscillation detection means for detecting oscillation and non-oscillation corresponding to the operating and non-operating states, respectively, of the timepiece; and switching means, coupled to the oscillation detection means for switching the source of power of the timekeeping means from the primary power means to the secondary power means and vice versa based on the oscillation or non-oscillation of the timekeeping means.

23. The electronic timepiece of claim 22 wherein the switching means switches the source of power of the timekeeping means from the primary power means to the secondary power means and vice versa based on the oscillation or non-oscillation of the timekeeping means and the energy stored in the secondary power means.

24. The electronic timepiece of claim 22 wherein the switching means causes the timekeeping means to be powered by the primary power means when the oscillation detection means detects no oscillation and the secondary power means cannot power the timekeeping means, and causes the timekeeping means to be powered by the secondary power means when the oscillation detection means detects the oscillation of the timekeeping means.

25. The electronic timepiece of claim 23 wherein the switching means causes the timekeeping means to be powered by the primary power means when the oscillation detection means detects no oscillation and the secondary power means cannot power the timekeeping means, and causes the timekeeping means to be powered by the secondary power means when the oscillation detection means detects the oscillation of the timekeeping means.

26. The electronic timepiece of claim 23, wherein the switching means powers the timekeeping means from the primary power means when the voltage of the secondary power means is below a predetermined level and powers the timekeeping means from the secondary power means when the voltage across the secondary power means is at or above the predetermined level.

27. The electronic timepiece of claim 22 further comprising limiter means for preventing the overcharging of the secondary power means by the first power means and coupling the first power means to the timekeeping means when the timepiece is in the non-operating state and the secondary power means cannot power the timekeeping means.

28. The electronic timepiece of claim 23 further comprising limiter means for preventing the overcharging of the secondary power means by the first power means and coupling the first power means to the timekeeping means when the timepiece is in the non-operating state and the secondary power means cannot power the timekeeping means.

29. The electronic timepiece of claim 22 wherein the oscillation detection means comprises an exclusive OR gate; time delay means coupled to the timekeeping means, wherein the inputs to the exclusive OR gate are the output of the timekeeping means and the output of the timekeeping means delayed by the time delay means; and biasing means coupled to the output of the exclusive OR gate for biasing the output of the exclusive OR gate.

30. The electronic timepiece of claim 29 wherein the time delay means comprises at least one diode.

31. The electronic timepiece of claim 23 wherein the oscillation detection means comprises an exclusive OR gate; time delay means coupled to the timekeeping means, wherein the inputs to the exclusive OR gate are the output of the timekeeping means and the output of the timekeeping means delayed by the time delay means; and biasing means coupled to the output of the exclusive OR gate for biasing the output of the exclusive OR gate.

32. The electronic timepiece of claim 31 wherein the time delay means comprises at least one diode.

* * * * *